Jan. 27, 1953 R. MORRISSETTE 2,627,037
STARTING-GENERATING AND IGNITION SYSTEM FOR
VEHICLES WITH AUTOMATIC CUTOFF SWITCHES
Filed April 11, 1952 3 Sheets-Sheet 1

Inventor
Roger Morrissette

By Clarence A. O'Brien
and Harvey B. Jacobson
Attorneys

Jan. 27, 1953 R. MORRISSETTE 2,627,037
STARTING-GENERATING AND IGNITION SYSTEM FOR
VEHICLES WITH AUTOMATIC CUTOFF SWITCHES
Filed April 11, 1952 3 Sheets-Sheet 2

Inventor
Roger Morrissette
By Clarence A. O'Brien
and Harvey B. Jacobson
Attorneys

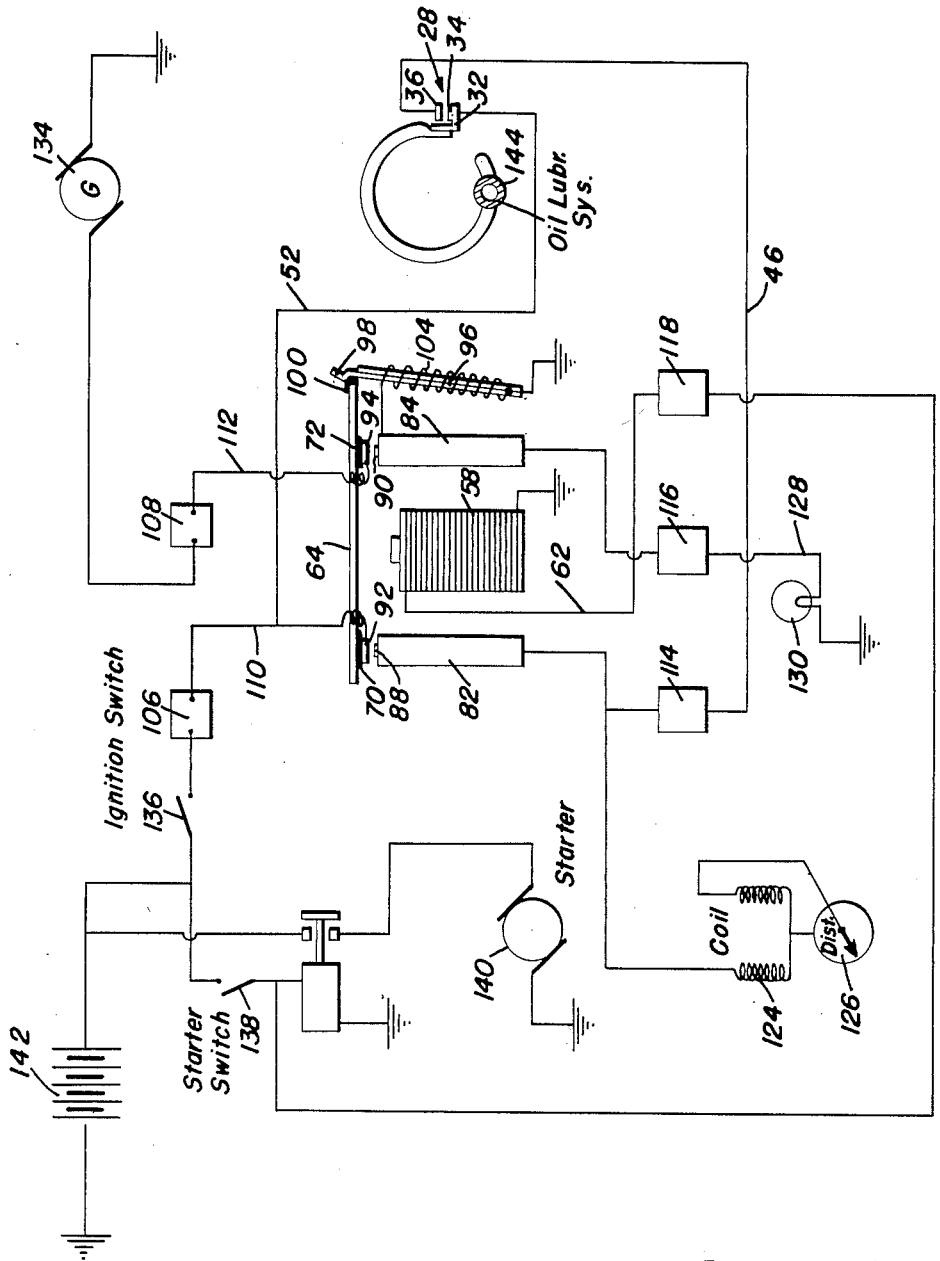

Patented Jan. 27, 1953

2,627,037

UNITED STATES PATENT OFFICE 2,627,037

STARTING-GENERATING AND IGNITION SYSTEM FOR VEHICLES WITH AUTOMATIC CUTOFF SWITCHES

Roger Morrissette, Rouyn, Quebec, Canada

Application April 11, 1952, Serial No. 281,810

7 Claims. (Cl. 290—37)

1

This invention relates to new and useful improvements in switches for the electrical circuits of vehicles and the like and is a continuation in part of my copending application Serial No. 55,113 filed October 18, 1948.

The primary object of the present invention is to provide a novel and improved cut-off switch interposed in an ignition circuit that will break the circuit upon a decrease of pressure in the lubricating system of the power means used in conjunction with the said switch, thereby making the power means inoperative until the fault in the lubricating system has been corrected.

Another important object of the present invention is to provide an automatic motor stop including a combined pressure and thermostatically operated switch controlling the ignition circuit of a vehicle, boat and the like and which is responsive to a predetermined oil pressure in the lubricating system for the vehicle in order to cut-off the ignition circuit.

Yet another object of the present invention is to provide a cut-off switch of the aforementioned character that will prolong the ignition points and coil.

A further object of the present invention is to provide a thermostatically and pressure operated cut-off switch for the ignition circuit of a vehicle, boat or the like and embodying novel and improved means for applying the same to the ignition circuit.

A still further aim of the present invention is to provide an automatic motor stop that is simple and practical in construction, strong and reliable in use, small and compact in structure, neat and attractive in appearance, efficient and durable in operation, relatively inexpensive to manufacture, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

2

Figure 1:
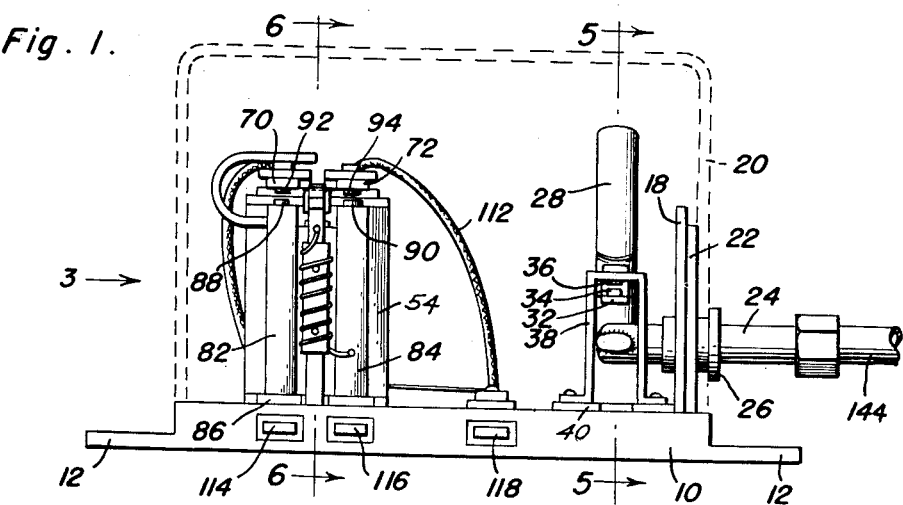
Figure 1 is a front elevational view of the present invention, the cover therefor being shown in dotted lines.
Figure 2:
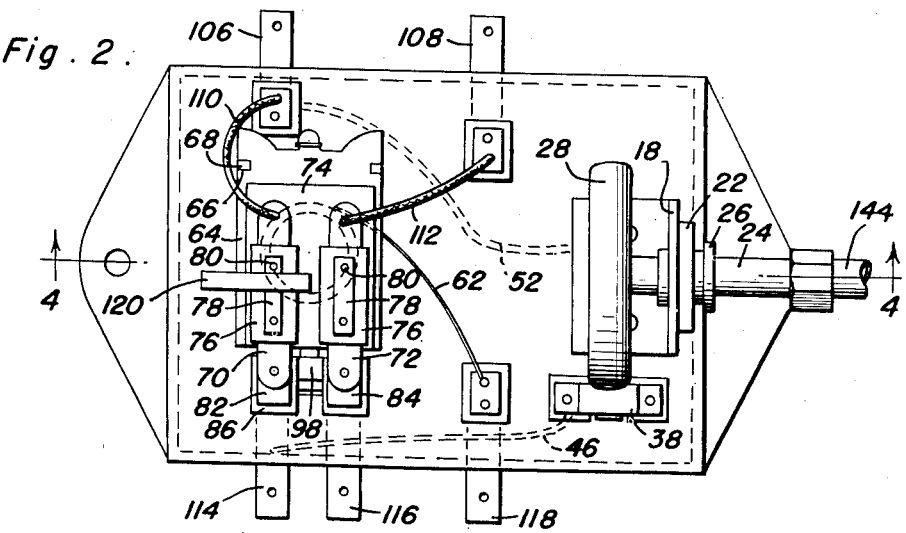
Figure 2 is a top plan view of Figure 1.
Figure 3:
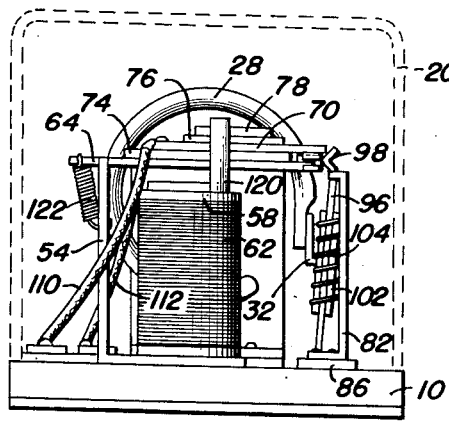
Figure 3 is an end view of the present invention taken substantially in the direction of arrow numbered 3 in Figure 1.
Figure 5:
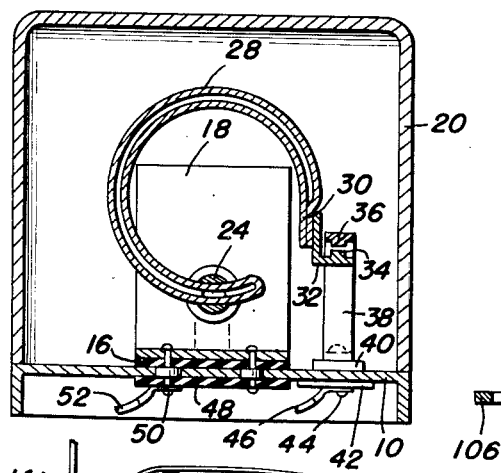
Figure 6:
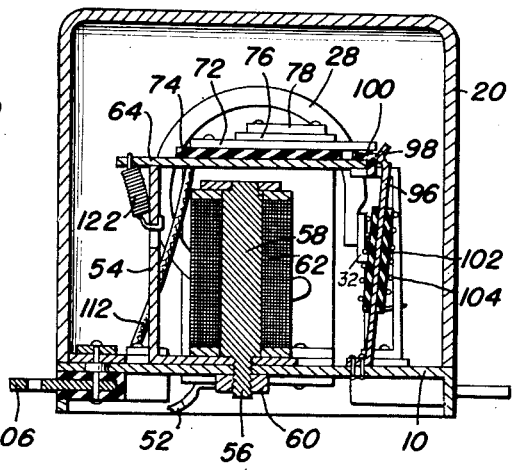
Figure 7:
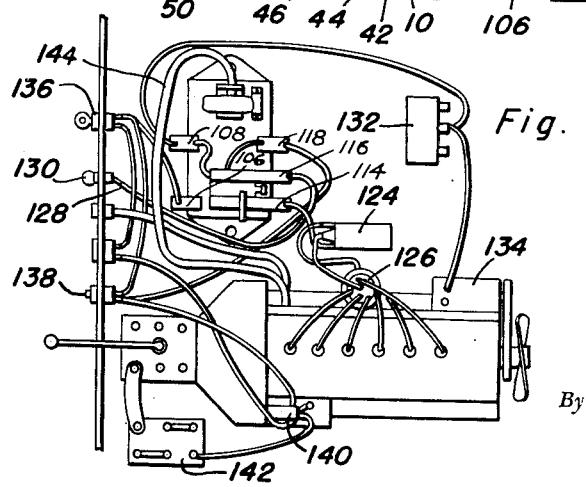

Figure 5 is a transverse vertical section view taken substantially on the plane of section line 5—5 of Figure 1;

Figure 6 is a transverse vertical sectional view taken substantially on the plane of section line 6—6 of Figure 1;

Figure 7 is a schematic diagram illustrating the special relationship of the various parts of the present invention in operational attachment with an internal combustion engine; and Figure 8 is a circuit diagram of the electrical connections of the various elements of the present invention.

Referring now to the drawings in detail, wherein for the purpose of illustration, there is disclosed a preferred embodiment of the present invention, the numeral 10 represents an elongated substantially rectangular base support having tapered end portions 12 that are provided with apertures 14 which receive suitable fasteners (not shown) whereby the present invention may be quickly and readily applied to a supporting structural element.

Mounted on the base support 10, at one end thereby, is a fiber plate 16 that supports the shorter leg of a substantially L-shaped plate 18 that is spaced from one end wall of a case or cover 20 for the base support 10. An insulating plate 22 is interposed between the case 20 and the plate 18 and cooperates with the case 20 and plate 18 in supporting an inlet nipple 24.

Figure 4:
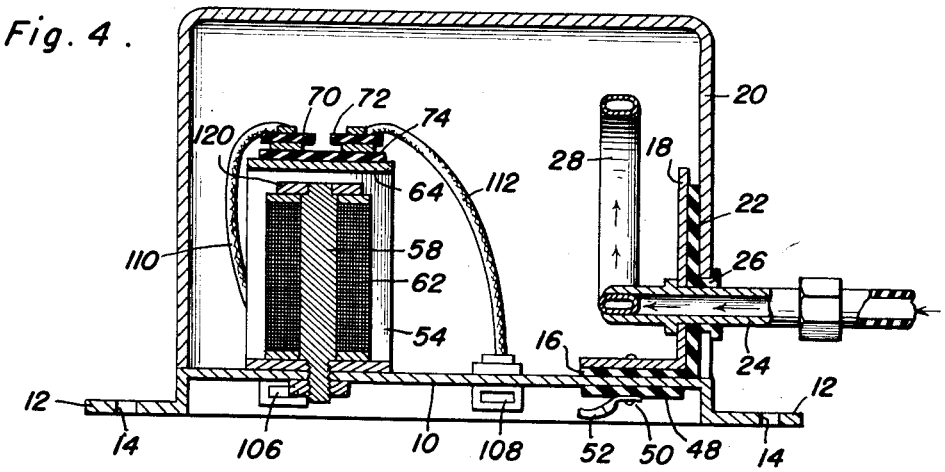
Figure 4 is a longitudinal vertical sectional view taken substantially on the plane of section line 4—4 of Figure 2.

An insulating sleeve 26 embraces the nipple 24 and spaces the latter from the opening in the case 20, as best shown in Figure 4 of the drawings.

An arcuate, flexible, conductive and resilient pressure switch or conduit 28, substantially oval in cross-section, communicates at one end with the open inner end of the nipple 24 and is closed at both its ends. The free end 30 of the pressure switch 28 supports an angle member 32 having a contact tip 34 that opposes a further contact tip 36 secured to the web portion of a U-shaped conductive bracket 38.

The leg portions of the U-shaped bracket 38 are turned outwardly and are supported on fiber plates 40 disposed on the base support 10. Further plates 42 on the underside of the base support 10 are secured to the out turned legs of the U-shaped bracket 38 and the plates 40 by rivets or the like 44 one of which supports a conductor 46.

A further fiber plate 48 is disposed under the base support 10 and is secured by rivets or the like 50 to the bracket 18 and the plate 16, and one of the rivets 50 supports one end of a flexible conductor 52.

One leg of an angle member or L-shaped support 54 is apertured to receive the threaded end 56 of an electro-magnet 58 that extends through an aperture in the base support 10 to receivably engage a nut 60 for retaining the magnet 58 and support 54 relative to the base 10, adjacent one end thereof.

The magnet 58 comprises a core having a suitable number of coils 62 wound thereon.

A substantially rectangular steel plate 64 is disposed above the magnet 58 and the longitudinal edges thereof are notched as at 66 to receive lugs 68 projecting upwardly from the angle member 54.

A pair of spaced parallel resilient plates 70 and 72 are supported on a fiber base plate 74 and each of plates 70 and 72 supports a fiber plate 76 and a steel plate 78, in the order named. The plates 74, 70 and 72, the fiber plates 76 and the steel plates 78 are fixed to the steel plate 64 by rivets or the like 80.

A pair of spaced parallel conductive channel members 82 and 84 are secured at one of their leg portions to fiber plates 86 on the base support 10 and the free leg portions of the channel members 82 and 84 support contact tips 88 and 90 that oppose contact tips 92 and 94 on the arms or plates 70 and 72 respectively.

Secured to the base support 10, between the channel members 82 and 84, is one end of a bimetal retainer spring 96 having an arcuate retaining lip 98 at its free end and that is adapted to engage an insulating pad 100 at one edge of the plate 64. Mica plates 102 are fixed to the spring 96 and are embraced by a resistance wire 104 the ends of which are welded to the channel member 84 and the spring 96 respectively (see Figure 1), the spring 96 being suitably grounded or one end of the wire 104 is connected to the member 84 and its other end grounded so that the wire 104 may be heated as a result of being electrically connected to a generator when the switch 64 is in its circuit closing position.

A pair of conductive plates 106 and 108 are fixed to the base support 10, project outwardly therefrom and are electrically connected to the plates or arms 70 and 72, respectively, by conductors 110 and 112.

Projecting outwardly from the opposite side of the base support 10 from the plates 106 and 108, is a further plurality of conductive plates 114, 116 and 118. The plate 118 is connected to one end of the wire 62 that is wound about the magnet 58, the plate 114 is connected to the conductor 46 leading from the bracket 38, and the plate 116 is electrically connected to the channel member 84 and therefor to contact 90.

One end of a U-shaped spring member 120 is secured, in any suitable manner, to the reduced end of the magnet 58, and the free end thereof is spaced above the plate 76 of the arm or plate 70 to limit the upward movement of the plate 64 relative to the magnet 58, and resilient members 122 form a connection between one end of the plate 64 and the support 54 to normally urge one end of the plate 64 upwardly and the contact tips 92 and 94 spaced relative to the contact tips 88 and 90.

In practical use of the present invention, the plate 114 is connected to the coil 124 of a vehicle ignition system and also to the distributor 126; the plate 116 is connected by a conductor 128 to a signal lamp 130 mounted on the vehicle dashboard; the plate 108 is electrically connected to the generator 134 of the vehicle; the plate 106 is electrically connected to the ignition switch 136 of the vehicle and also to the starter switch 138, the starter 140 and the battery 142; and, the nipple 24 is coupled to the oil lubricating system conduit by an insulating pipe or flexible, rubber oil hose 144.

When the ignition switch 136 is closed, current will not pass to the coil 124 or the distributor 126 since contacts 92 and 94 of plate 64 will be spaced from the contacts 88 and 90. Thus, if the ignition switch is left on, the points of the distributor and the coil 124 will not become burned.

After the ignition switch has been actuated to its closed position, the starter switch 138 is closed and the current from battery 142 will pass through conductors 118, 62 and to electro-magnet 58. When electro-magnet 58 is energized it will attract members 64 thereto so that contacts 92 and 94 will engage contacts 88 and 90. As the plate 64 moves toward the electro-magnet 58, the lip 98 of spring 96 will be engaged over plate 64, so that even though the switch 138 returns to its open position, the contacts 92 and 94 will be retained in engagement with contacts 88 and 90.

The circuit to the coil 124 and distributor 126 is now completed to start the engine and the current from generator 134 passes to the heater wire 104 and also to signal light 130, the light 130 indicating the activation of the generator. As the oil pressure builds up in conduit 144 section 28 will flex to bring contact 34 into engagement with contact 36. As wire 104 is electrically connected to the generator 134 through conductive parts 84, 90, 94, 112 and 108, wire 104 is heated by the generator sufficiently to flex arm 96 and cause lip 98 to release plate 64, whereupon spring 122 raises plate 64 to space contacts 92 and 94 from contacts 88 and 90 breaking the circuit to lamp 130. Then the entire circuit is controlled solely by the pressure responsive switch 28, 36, 36 so that should the oil pressure decrease below a predetermined safe value, section 28 will flex and contact 34 will be spaced from contact 36 to break the circuit and cause stopping of the vehicle motor or engine.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an ignition system of an internal combustion engine including an ignition switch, a starter switch, an ignition coil and a generator, a safety cut-off device comprising a switch member having first and second stationary contacts, a pressure controlled switch electrically connected in parallel with the switch member, a conductor connecting the pressure responsive switch to the first contact and to the coil, a signal lamp connected to the second contact, an electrically controlled second switch member including first and second movable contacts registering with and normally spaced from the first and second stationary contacts, said first movable contact being electrically connected to the ignition switch and said second movable contact being electrically connected to the generator, a thermal responsive retainer means connected to the second stationary contact, and an electro-magnet facing the second switch member and connected to the starter switch to be energized when the starter switch is actuated to its circuit closing position to attract the second switch member and cause the movable contacts to engage the stationary contacts, whereupon the engine is started to direct current from the generator to the thermal responsive means to cause the latter to release the second switch member.

2. In an ignition system of an internal combustion engine including a generator, a cut-off switch system comprising an electrically controlled switch, means urging said electrically controlled switch to an open position, an electro-magnet closing said electrically controlled switch upon actuation of said electro-magnet, a pressure controlled switch electrically connected in parallel connection with said electrically controlled switch, thermal responsive retainer means holding said electrically controlled switch in closed position after said electrically controlled switch has been closed by said electro-magnet, and thermal means positioned about said retainer means and electrically operatively connected to said generator, said thermal means being actuated by the generator to release said electrically controlled switch to permit said first recited means to open said electrically controlled switch.

3. A cut-off switch system for an ignition system of an internal combustion engine having a generator comprising an electrically controlled switch, means urging said electrically controlled switch to an open position, an electro-magnet closing said electrically controlled switch upon actuation of said electro-magnet, a pressure controlled switch electrically connected in parallel connection with said electrically controlled switch, thermal responsive retainer means holding said electrically controlled switch in closed position after said electrically controlled switch has been closed by said electro-magnet, and thermal means positioned about said retainer means and electrically operatively connected to the generator through the electrically controlled switch, said thermal means upon closing of said electrically controlled switch urging said retainer means to release said electrically controlled switch to permit said first recited means to open said electrically controlled switch, said retainer means comprising a bimetallic strip having an electrically insulative layer therearound, said thermal means comprising a resistance coil positioned in encompassing relationship about said insulative layer.

4. A cut-off switch system for an ignition system of an internal combustion engine having a generator comprising an electrically controlled switch, means urging said electrically controlled switch to an open position, an electro-magnet closing said electrically controlled switch upon actuation of said electro-magnet, a pressure controlled switch electrically connected in parallel connection with said electrically controlled switch, thermal responsive retainer means holding said electrically controlled switch in closed position after said electrically controlled switch has been closed by said electro-magnet, and thermal means positioned about said retainer means and electrically operatively connected to said generator through said electrically controlled switch, said thermal means upon closing of said electrically controlled switch urging said retainer means to release said electrically controlled switch to permit said first recited means to open said electrically controlled switch, said pressure controlled switch including an arcuate expansible and contractible conduit, and means for connecting said conduit to a source of oil pressure of the internal combustion engine.

5. A cut-off switch system for an ignition system of an internal combustion engine having a generator, said system comprising an electrically controlled switch, means urging said electrically controlled switch to an open position, an electro-magnet closing said electrically controlled switch upon actuation of said electro-magnet, a pressure controlled switch electrically connected in parallel connection with said electrically controlled switch, thermal responsive retainer means holding said electrically controlled switch in closed position after said electrically controlled switch has been closed by said electro-magnet, and thermal means positioned about said retainer means and electrically operatively connected to said generator through said electrically controlled switch, said thermal means upon closing of said electrically controlled switch urging said retainer means to release said electrically controlled switch to permit said first recited means to open said electrically controlled switch, said retainer means comprising a bimetallic strip having an electrically insulative layer therearound, said thermal meals comprising a resistance coil positioned in encompassing relationship about said insulative layer, said pressure controlled switch including an arcuate expansible and contractible conduit, and means for connecting said conduit to a source of oil pressure of the internal combustion engine.

6. In an ignition system of an internal combustion engine of the type that includes an ignition switch, a starter switch and a generator; a safety cut-off switch device comprising first and second stationary contacts, first and second movable contacts, a magnetic plate supporting the movable contacts and insulated from the movable contacts, said movable contacts being in registry with said stationary contacts, spring means urging the plate away from the stationary contacts to space the movable contacts from the stationary contacts, an electro-magnet electrically connected to the starter switch and facing the plate to move the plate toward the stationary contacts and cause the movable contacts to engage the stationary contacts when the starter switch is closed, a thermal responsive retaiinng means electrically connected to the second stationary contact and adapted to engage and hold the plate with the movable contacts engaged with the stationary contacts when the plate is attracted by the electromagnet, said second movable contact being electrically connected to the generator to permit heating of the thermal responsive means by the generator when the second movable contact is engaged with the second stationary contact, after which the retaining means will release the plate and the spring means will move the plate to space the movable contacts from the stationary contacts, and a pressure responsive switch means connected to the first stationary contact and to the ignition switch to control the circuit after the plate is released by the retaining means.

7. The combination of claim 6 and a signal lamp electrically connected with the second stationary contact to be energized by the generator when the second movable contact is engaged with the second stationary contact.

ROGER MORRISSETTE.

REFERENCES CITED

The following references are of record in the file of this patent:

UNITED STATES PATENTS

| Number | Name | Date |
|---|---|---|
| 1,382,414 | Dorsey | June 21, 1921 |
| 1,444,403 | Varley | Feb. 6, 1923 |
| 1,654,220 | Johnstone et al. | Dec. 27, 1927 |
| 1,702,490 | Brach | Feb. 19, 1929 |
| 1,741,409 | Dunn | Dec. 31, 1929 |
| 1,820,702 | Hodgkins | Aug. 25, 1931 |
| 1,828,299 | Shuey | Oct. 20, 1931 |
| 2,166,498 | Lacey | July 18, 1939 |
| 2,471,181 | Wilson | May 24, 1949 |